United States Patent [19]

Sugiyama et al.

[11] Patent Number: 5,264,687
[45] Date of Patent: Nov. 23, 1993

[54] OPTICAL CARD PROCESSING APPARATUS

[75] Inventors: Sadao Sugiyama, Shiga; Yoshihito Koshiba, Kyoto; Takeshi Ishida; Takeshi Takakura, both of Takatsuki, all of Japan

[73] Assignee: Omron Tateisi Electronics, Co., Kyoto, Japan

[21] Appl. No.: 449,452

[22] Filed: Dec. 12, 1989

Related U.S. Application Data

[63] Continuation of Ser. No. 357,632, May 24, 1989, abandoned, which is a continuation of Ser. No. 209,314, Jun. 21, 1988, abandoned.

[30] Foreign Application Priority Data

| Jun. 23, 1987 | [JP] | Japan | 62-157289 |
| Jul. 20, 1987 | [JP] | Japan | 62-110839 |
| Jul. 21, 1987 | [JP] | Japan | 62-112512 |
| Jul. 22, 1987 | [JP] | Japan | 62-112833 |
| Jul. 23, 1987 | [JP] | Japan | 62-113285 |
| Jul. 24, 1987 | [JP] | Japan | 62-114377 |

[51] Int. Cl.$^5$ .............................. G06K 13/04
[52] U.S. Cl. ...................... 235/479; 235/475
[58] Field of Search ............ 335/475, 479; 360/2, 360/88

[56] References Cited

U.S. PATENT DOCUMENTS

| 3,940,796 | 2/1976 | Haun | 235/479 |
| 4,170,348 | 10/1979 | Helmut et al. | |
| 4,800,258 | 1/1989 | Suzuki | 360/2 |
| 4,900,908 | 2/1990 | Tsutsui | 360/2 |

FOREIGN PATENT DOCUMENTS

| 0200434 | 12/1986 | European Pat. Off. |
| 0224250 | 6/1987 | European Pat. Off. |
| 0254328 | 1/1988 | European Pat. Off. |
| 0257532 | 3/1988 | European Pat. Off. |
| 57-64182 | 4/1982 | Japan |
| 57-106989 | 7/1982 | Japan |
| 57-199904 | 12/1982 | Japan |
| 58-40692 | 3/1983 | Japan |
| 62-92163 | 4/1987 | Japan |
| 62-92274 | 4/1987 | Japan |
| 62-92277 | 4/1987 | Japan |
| 63-32792 | 2/1988 | Japan |
| 63-52374 | 3/1988 | Japan |

*Primary Examiner*—Harold Pitts
*Attorney, Agent, or Firm*—Dickstein, Shapiro & Morin

[57] ABSTRACT

There is provided an optical card processing apparatus comprising: a card holder which is supported to a guiding mechanism so as to be reciprocated and is formed with an optical card holding portion on a lower surface; a card loading/ejecting mechanism, arranged at a card inserting port, for detecting an optical card and for attaching and detaching the optical card to and from the optical card holding portion of the card holder. A card inclination correcting mechanism is arranged for the card holder, for making a track line direction of the optical card coincide with a moving direction of the card holder. A card transfer mechanism in which a pair of pulleys are arranged along a moving path of the card holder, an endless belt is wound between the pair of pulleys, a proper portion of the belt is coupled with the card holder, and one of the pulleys is coupled with a drive motor which rotates in a single direction.

7 Claims, 9 Drawing Sheets

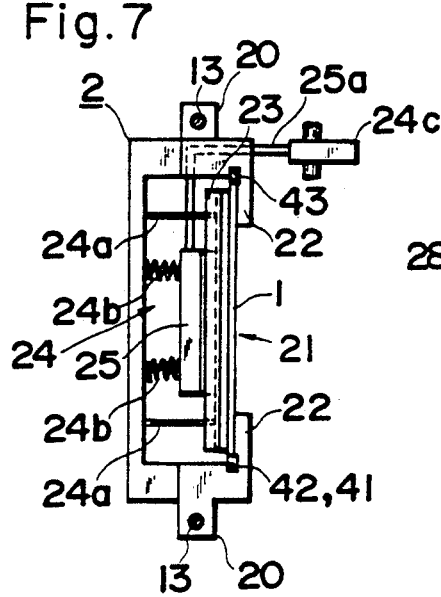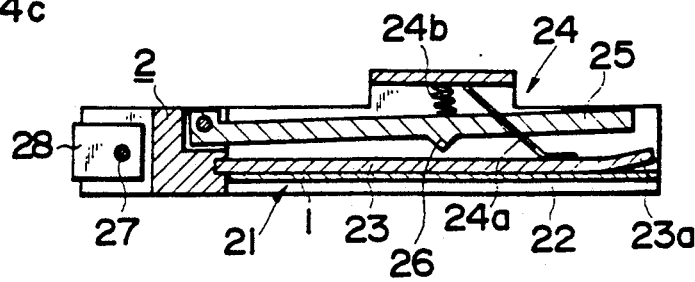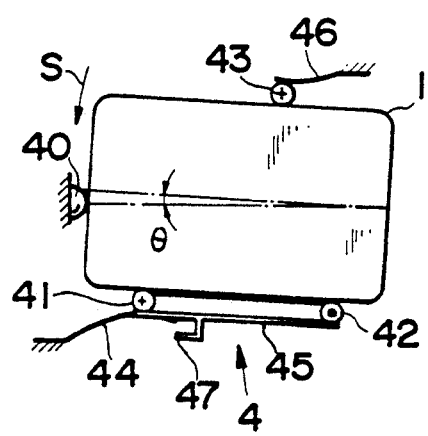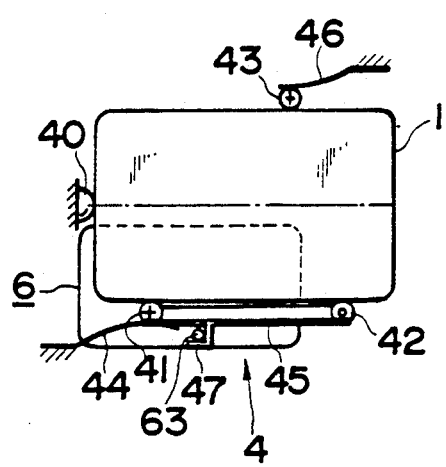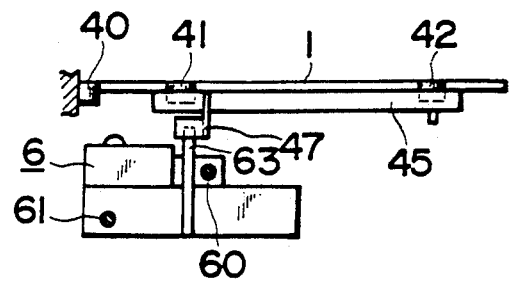

OPTICAL CARD PROCESSING APPARATUS

This application is a continuation of Ser. No. 357,632, filed May 24, 1989, which is a continuation of Ser. No. 209,314, filed Jun. 21, 1988, both abandoned.

BACKGROUND OF THE INVENTION

1. Field of the Invention

The present invention relates to an optical card processing apparatus for performing both of or either one of the recording (writing) and the playing-back (reading) of information onto and/or from a card-shaped recording medium by use of a light beam.

2. Description of the Related Background Art

In a conventional optical card processing apparatus, as shown in FIG. 23, a holder 91 having a card holding portion on the upper surface thereof is supported by guide rods 93 so as to reciprocate, the holder 91 is reciprocated through a belt 92 by a drive motor 94 which forwardly and reversely rotates, and an optical head 95 to perform both of or either one of the writing and the reading of information onto/from an optical card 1 is provided over the holder 91. The optical head 95 is arranged so as to face the recording track of the optical card 1 and is moved relatively to the card 1, thereby performing the recording and/or reproducing processes of the information.

According to the above conventional optical card processing apparatus, the card holder 91 is reciprocated by the drive motor 94 which forwardly and reversely rotates, so that the switching control is complicated and the reciprocating operation cannot be performed at a high speed.

Further, since a load which acts on the motor 94 is large, a large motor is needed. The card holder transfer mechanism is arranged under the card holder 91. The optical head 95 and optical head transfer mechanism are arranged over the card holder 91. Thus, the size of the processing apparatus increases. In addition, when the optical card 1 is held by the card holder 91, the track direction of the optical card 1 is easily inclined with respect to the moving direction of the card holder 91 so that an erroneous tracking operation is performed. The conventional apparatus has such various problems as mentioned above.

On the other hand, since the center of gravity of the card holder 91 and the drive center of the holder transfer mechanism are deviated, when the card holder 91 is stopped or started, yawing and pitching of the card holder 91 occur in particular. Thus, there are problems such that a spot light which is irradiated to an optical card finely oscillates and the correct information cannot be recorded and reproduced.

According to the structure such that the optical bead is arranged over the card holder, in particular, since the vibration which is caused when the card holder is reciprocated is propagated to the optical head, the optical head oscillates and a spot light to the optical card is finely deviated. Thus, there is a problem such that the correct information cannot be recorded and reproduced.

Further, the foregoing conventional optical card processing apparatus does not have a mechanism to correct the positioning reproducibility when an optical card is held to the card holder and the angle of inclination of the card held by the card holder which is caused due to the accuracy of the shape of the optical card. Consequently, there are problems such that the dynamic range of the tracking servo must be widened and the tracking performance must be raised.

Further, according to the conventional optical card processing apparatus, since an optical card is directly attached to and detached from the card holding portion of the card holder by the manual operation, not only the attaching and detaching operations are complicated but also, particularly, there is a fear such that the attaching position of the optical card is deviated from the correct position. Thus, there is a problem of the lack of reliability. Although there is considered a method whereby as in a magnetic card processing apparatus, a pair of upper and lower conveying rollers are arranged on the inside of the inserting port and an optical card is conveyed by these rollers. However, in the case of the optical card, since the high accuracy is required in the card feeding operation, the optical card must be held by the card holder and conveyed. Therefore, in such a kind of apparatus, there is a problem such that the reciprocating operation of the card holder becomes an obstacle and the conveying roller system cannot be used.

SUMMARY OF THE INVENTION

It is an object of the present invention to provide a novel optical card processing apparatus in which the foregoing various kinds of problems can be solved by a relatively simple structure, the apparatus can be miniaturized, and the recording and playing-back operations of information can be executed at a high speed.

Another object of the invention is to provide a novel optical card processing apparatus in which by devising the construction of the card holder transfer mechanism, the arrangement of the transfer mechanism and optical head for the card holder, the positional relation between the center of gravity of the card holder and the drive center of the card transfer mechanism, and the like, the foregoing conventional various kinds of problems can be solved, the apparatus can be made thin and miniaturized, and the information recording and reproducing operations can be executed at a high speed.

Still another object of the invention is to provide a novel optical card processing apparatus in which by devising the structure of the card holder transfer mechanism and the arrangement of the transfer mechanism and optical head for the card holder, the foregoing conventional various kinds of problems can be solved,, the apparatus can be made thin and miniaturized, and the information recording and reproducing operations can be executed at a high speed.

Still another object of the invention is to provide a novel card holding mechanism in which by combining the optical head transfer mechanism and the card holding mechanism whose card holding force can be adjusted to a large or small value, the inclination of the card can be corrected at a high accuracy.

Still another object of the invention is to provide a novel optical card processing apparatus in which an angle of inclination of the information recording track with respect to the transfer direction of an optical card is detected and the inclination of the optical card can be corrected in accordance with the detection value.

Still another object of the invention is to provide a novel optical card processing apparatus in which an optical card is automatically took in and ejected from a fixed position of the card holder by use of special rollers which are come into contact with the optical card only when the optical card is attached to or detached from the card holder and which are not come into contact with the optical card and card holder when the recording and playing-back operations is performed, so that the foregoing conventional various kinds of problems can be solved, the inserting operation of the optical card can be simplified, the attaching position can be accurately set, and the operating reliability can be improved.

Still another object of the invention is to provide a novel card holding apparatus in which by constructing a supporting mechanism to support the sides of a card to the card holder in a point contact manner the structure can be simplified, the contact frictional force can be reduced, and the loading motor and card transfer motor can be miniaturized.

According to the present invention, an optical card processing apparatus comprising: a card holder which is supported to a guiding mechanism so as to be reciprocated and is formed with an optical card holding portion on a lower surface; a card loading/ejecting mechanism, arranged at a card inserting port, for detecting an optical card and for attaching and detaching the optical card to and from the optical card holding portion of the card holder; a card inclination correcting mechanism, arranged for the card holder, for making a track line direction of the optical card coincide with a moving direction of the card holder; a card transfer mechanism in which a pair of pulleys are arranged along a moving path of the card holder, an endless belt is wound between the pair of pulleys, a proper portion of the belt is coupled with the card holder, and one of the pulleys is coupled with a drive motor which can rotates in a single direction, respectively; an optical head, arranged on the same side as the card transfer mechanism with respect to the card holder so as to face the optical card, for writing and reading information onto and from the optical card; and a transfer mechanism to move the optical head in the direction perpendicular to the moving direction of the optical card.

According to the above structure, the optical card inserted into the inserting port is automatically come into engagement with the card holding portion of the holder by the card loading/ejecting mechanism. The track line direction of the optical card is corrected by the inclination correcting mechanism so as to coincide with the moving direction of the card holder. According to the invention, the card holder is reciprocated by the rotation in the single direction of the drive motor, thereby relatively moving the optical card for the optical head and executing the processes to write and read information. Thus, the motor can be miniaturized, and the writing and reading operating speed and accuracy are improved.

A card transfer mechanism according to the present invention comprises: a card holder supported by a guiding mechanism so as to be reciprocated and having a card holding portion; a slide member provided for the card holder and sliding in the direction perpendicular to a reciprocating direction of the card holder; a transfer mechanism which is arranged below the card holder and in which an endless belt is wound between a pair of pulleys and one of the pulleys is coupled with a drive motor which rotates in a single direction; and a coupling pin whose lower portion is fixedly attached to the endless belt and whose upper portion is rotatably attached to the slide member, wherein a center of gravity of the card holder and a drive center of the transfer mechanism are set on the same line.

According to the invention, the card holder is reciprocated by the continuous rotation in the single direction of the drive motor. Therefore, as compared with the conventional apparatus using a motor which rotates forwardly and reversely, the abrasion of the brush and the vibrations at the time of the forward and reverse rotations do not occur and the durability is improved.

Moreover, since it is sufficient to rotate the motor in a single direction, the load is reduced and the card holder can be reciprocated at a high speed by a small motor. Thus, the information writing and reproducing speeds are improved.

On the other hand, according to the invention, the card transfer mechanism is arranged below the card holder. The center of gravity of the card holder and the drive center of the transfer mechanism are set on the same line. Therefore, the yawing and pitching upon movement of the card holder are eliminated. The card transfer accuracy is further improved.

An optical card processing apparatus according to the invention comprises: a guiding mechanism to support a card holder so as to be reciprocated; the card holder which is supported by the guiding mechanism and has a card holding portion on a lower surface; a transfer mechanism, arranged below the card holder, for reciprocating the card holder; and an optical head for performing at least one of the writing and reading of information to and from an information recording portion of the optical card.

According to the invention, the card holder is reciprocated by the continuous rotation in the single direction of the drive motor. Therefore, as compared with the conventional apparatus using the motor which rotate forwardly and reversely, the abrasion of the brush and the vibrations upon forward and reverse rotations do not occur and the durability is improved.

Further, since the motor rotates in a single direction, the load is reduced and the card holder can be reciprocated at a high speed by a small motor. Thus, the information writing and reading speeds are improved.

On the other hand, according to the invention, since the card transfer mechanism and optical head are arranged below the card holder, as compared with the conventional apparatus, the height of the apparatus is reduced into the half or shorter and the apparatus can be remarkably made thin and miniaturized. In addition, since the optical head is supported to the lower portion of the apparatus, it is hardly influenced by the vibration when the card holder reciprocates. The information writing and reading operations can be accurately executed and the reliability is improved.

A card holding mechanism according to the invention comprises: a card holder having flanges by which both side portions of a card are supported; a card pressing plate whose both sides correspond to the flanges; and pressurizing means which is coupled with the card pressing plate and can adjust the intensity of a pressing force.

According to the invention, when an optical card is attached to or removed from the card holder, by setting the card holding force to the card pressing plate to a weak force, the frictional load is small. Therefore, a card loading/ejecting actuator of small size, low torque and low cost can be used.

On the contrary, when information is written onto and read from an optical card, by setting the card holding force of the card pressing plate to a strong force, no positional deviation of the card occurs, so that the card can be transferred at a high speed and the card information processing speed can be raised.

Further, in the case of correcting an angle of inclination of the card, by setting the card holding force to a weak force, the frictional load upon correction is small. Therefore, an adjusting actuator of small size, low torque and low cost can be used. Also, the card holding force upon adjustment is not zero. Accordingly, when the card is again strongly held, the position of the card is not deviated.

Moreover, according to the present invention, an optical card processing apparatus in which an optical card is moved for an optical head and information is written onto or read from an information recording track of the optical card by the optical head, the processing apparatus comprising: a movable holder to hold the optical card; a card transfer mechanism to move the optical card together with the holder; card holding means for acting a pressure on the optical card when the holder moves and thereby for fixing the optical card to the holder; an optical card inclination detecting means for detecting an angle of inclination of the information recording track with respect to the moving direction of the optical card; and a card inclination correcting mechanism for moving the optical card, in a state in which the pressure by the card holding means is set to a weak force, on the basis of a detection value of the optical card inclination detecting means and thereby for making the moving direction of the optical card coincide with the direction of the information recording track.

Prior to writing or reading information onto or from the optical card, the optical card inclination detecting means is first made operative to detect the angle of inclination of the information recording track with respect to the moving direction of the optical card. Next, the pressure by the card fixing means is reduced for enabling the optical card to be displaced on the holder. After that, the optical card is displaced by the card inclination correcting mechanism on the basis of the detection value of the inclination angle, thereby making the moving direction of the card coincide with the direction of the information recording track. Next, the pressure by the card fixing means is made act on the optical card, thereby fixing the card onto the holder. Subsequently, the card transfer mechanism is activated to move the optical card together with the holder, thereby writing or reading information by the optical head.

According to the invention, when information is written or read, the moving direction of the optical card can be always made coincide with the direction of the information recording track. Therefore, even if the movable range of the tracking servo is narrow, or even if the tracking performance is no so good, no problem occurs. Further, there is no need to manage the shape of the optical card with a high accuracy.

According to the present invention, an optical card processing apparatus comprising: a card holder which is supported to a guiding mechanism so as to be reciprocated and has an optical card holding portion; and a card loading/ejecting mechanism for automatically carrying or ejecting an optical card inserted from a card inserting port into or from the optical card holding portion,, wherein the card loading/ejecting mechanism comprises a detector, arranged so as to face a passage of the optical card, for detecting the optical card, and a loading roller which is come into contact with the optical card only in the case of attaching or removing the optical card onto or from a card holder and conveys the optical card and which does not come into contact with the optical card and the card holder upon writing or reading.

According to the foregoing structure, only when the optical card is attached to or removed from the card holder, the loading roller acts to forcedly convey the optical card. Therefore, the optical card is always attached to the accurate position of the card holder and the reliability in writing and reading is improved. On the other hand, according to the invention, when information is written or read, the roller does not come into contact with the optical card and card holder, so that it does not obstruct the movement of the card holder.

A card holding apparatus according to the present invention comprises a card holder and a supporting mechanism, provided for the card holder, for supporting at least three portions of the opposite sides of a card in a point contact manner.

According to the foregoing structure of the invention, since at least three portions of the sides of the card are supported in a point contact manner, the contact frictions of the card supporting portions are small. A motor of a low torque can be used as a loading motor.

On the other hand, according to the invention, in particular, since three portions of the parallel sides of the card are supported in a point contact manner, by adjusting the deviations of the supporting points in accordance with the deformation of the card, even the deformed card can be stably held.

Further, as compared with the conventional holder having straight guides, the card holder is remarkably simplified and decreased in weight, so that the card transfer motor can be miniaturized.

According to the invention, a card transfer mechanism in which slide bearings are arranged on both sides of a card holder and which slidably supports the card holder to the parallel guide shafts, wherein elastic pressurizing means is arranged between at least one of the guide shafts and the slide bearing.

According to the foregoing structure, since the slide bearings are supported by the pressurizing means with a constant pressure to the guide shafts, even if the precision of the parts of the guide shafts and bearings and the assembling accuracy are not set to so high level as those in the conventional apparatus, the card transfer accuracy can be improved. Moreover, the sizes and weights of the guide shafts and bearings can be reduced. The costs of the parts and the assembling costs can be also decreased.

According to the present invention, a card transfer mechanism in which both sides of a card holder are slidably supported by parallel guide shafts, wherein both of the guide shafts are constituted in a manner such that the whole length of the outside surface is supported by a frame and the opposite inside surfaces serve as the guide surfaces, and a guide member which slides on the guide surface is provided for the card holder.

According to the foregoing structure, the whole length of the guide shafts is supported by the frame and the deflection by the bearing pressure is blocked and the vibrations of the guide shafts and card holder are reduced. Thus, the tracking performances in the auto focusing and auto tracking control are improved. The card transfer speed can be raised.

On the other hand, although the thin guide shafts are used, since the vibration of the guiding system is hardly generated, the apparatus can be miniaturized and the weight and costs of the apparatus can be reduced.

BRIEF DESCRIPTION OF THE DRAWINGS

FIG. 7 is a front view showing the structure of the card holding mechanism;

FIG. 8 is a cross sectional view showing the operation of the card holding mechanism;

FIGS. 9 and 10 are plan views for explaining a construction of a card inclination correcting mechanism, respectively;

FIG. 11 is a front view of the card inclination correcting mechanism;

FIG. 17 is a plan view of a card transfer mechanism;

FIG. 18 is a cross sectional view taken along the line XVIII—XVIII in FIG. 17;

FIG. 19 is a cross sectional view taken along the line IXX—IXX in FIG. 17;

FIG. 20 is a partial enlarged diagram of FIG. 17;

DETAILED DESCRIPTION OF THE PREFERRED EMBODIMENTS

Figure 1:
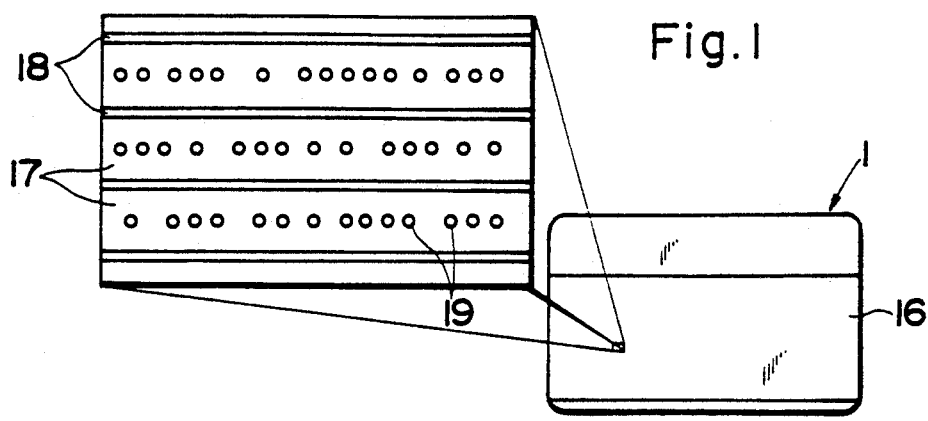
FIG. 1 shows a whole optical card and an enlarged part of this card.

FIG. 1 is a diagram showing a whole optical card from and onto which data is read (play-back) or written (recorded) by an optical card processing apparatus and also shows a partial enlarged diagram of this card. The optical cards include not only the card to/from which information can be optically read/written but also the card to/from which information can be magnetooptically read/written. A number of information recorded or recording tracks 17 specified by track guides 18 are formed in an information recording portion 16 of an optical card 1. Sits indicative of information are recorded on the tracks 17 in a form of pits 19 (in the case of optically recordable and reproducible card). The track guides 18 are provided for allowing an optical head for writing and reading to trace the tracks (for the purpose of what is called a tracking control).

Figure 2:
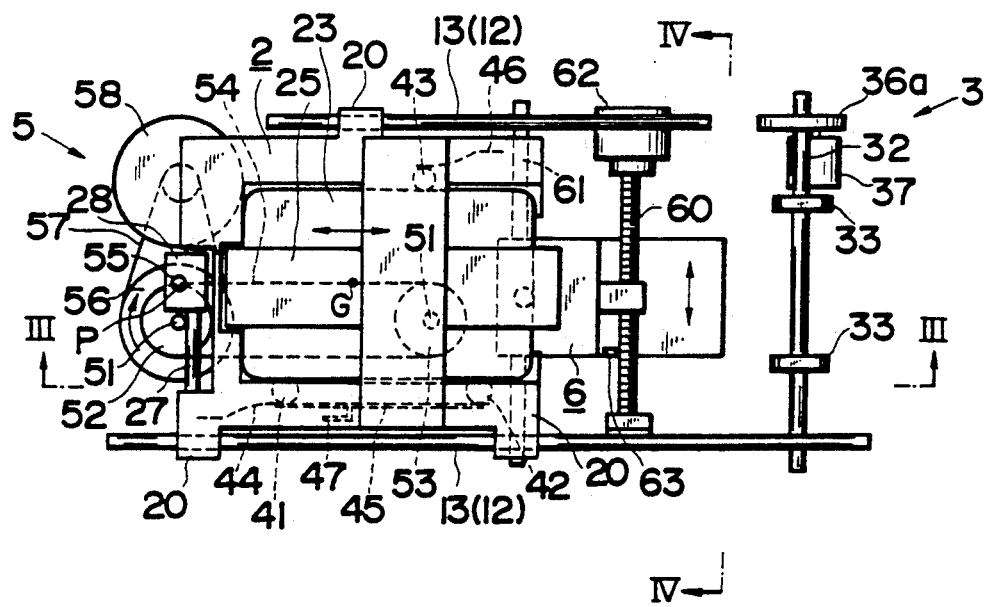
FIG. 2 is a plan view showing a schematic arrangement of a card processing apparatus according to an embodiment of the invention.
Figure 3:
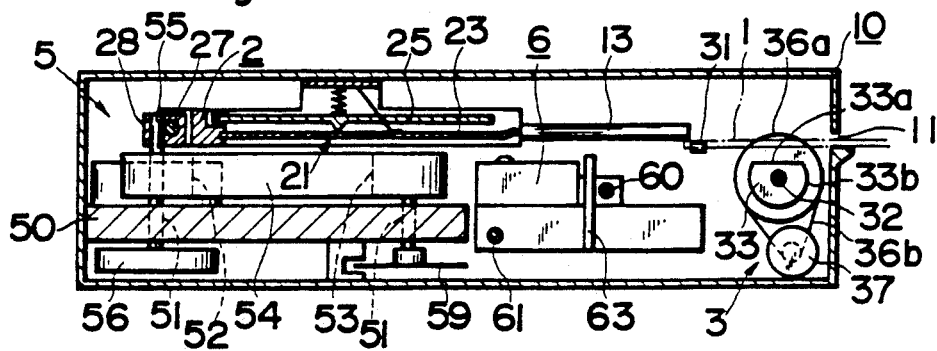
FIG. 3 is a cross sectional view taken along the line III—III in FIG. 2.
Figure 4:
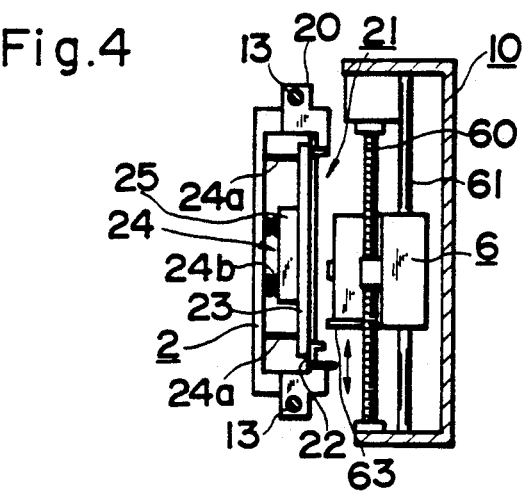
FIG. 4 is a cross sectional view taken along the line IV—IV in FIG. 2.
Figure 5:
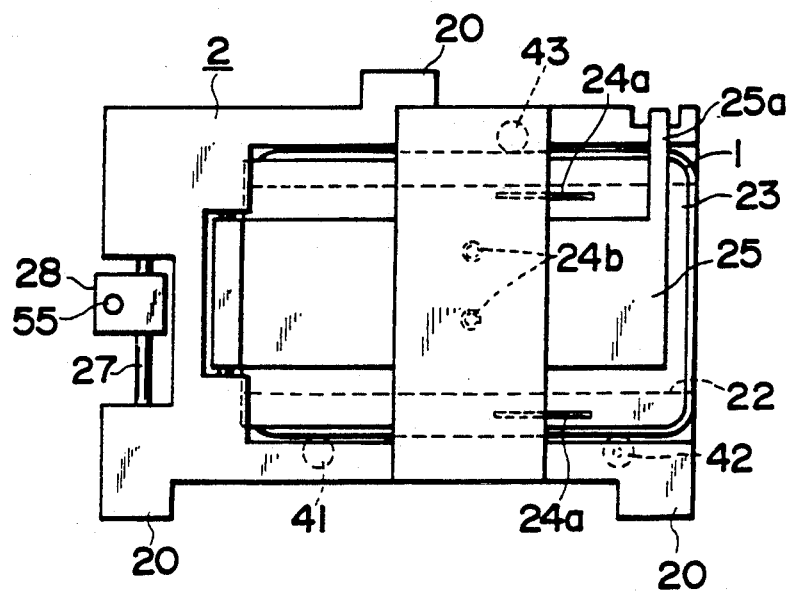
FIG. 5 is a plan view of a holder showing an external view of a card holding mechanism.
Figure 6:
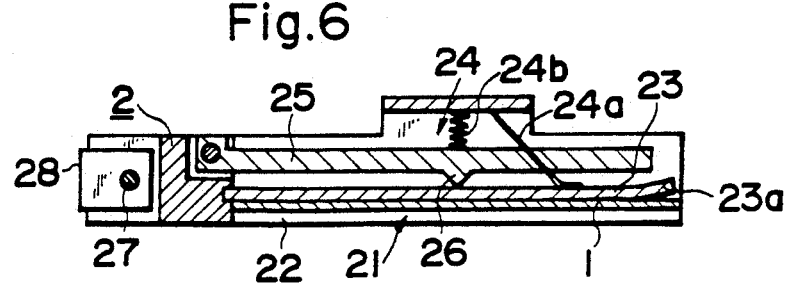
FIG. 6 is a cross sectional view showing a structure of the card holding mechanism.

FIGS. 2 to 4 show an optical card processing apparatus according to an embodiment of the invention.

In the optical card processing apparatus, a guiding mechanism 12 is constructed by arranging two guide rods 13 in parallel in a casing 10 having a card inserting port 11. A card holder 2 is supported by the guiding mechanism 12 so as to be movable along the guide rods 13. An optical head 6 is arranged on the card inserting side in correspondence to the lower portion of the holder moving path and a card transfer mechanism 5 is arranged on the rear side, respectively.

The holder 2 is slidably supported by the guide rods 13 through bearings 20 attached to both sides of the bolder 2. A card holding mechanism 21 is arranged below the holder 2 and is positioned in height so as to correspond to the location of the card inserting port 11 of the casing 10.

As illustrated in FIGS. 4 to 8, the card holding mechanism 21 is constructed in a manner such that a flange 22 which projects inwardly is formed on the lower portion of the opposite side wall of the holder 2, thereby supporting both side portions of the optical card 1. A card pressing plate 23 whose both side portions face the flange 22 is arranged between the side walls. Pressurizing means 24 which can adjust the intensity of the pressing force is provided for the card pressing plate 23. A portion 23a on the card inserting port side of the card pressing plate 23 is slightly bent so as to keep a gap between the plate 23 and the flange 22. On the other hand, the edge portion on the opposite side of the card pressing plate 23 is loosely fitted into a concave portion formed in the holder 2.

The pressurizing means 24 comprises springs 24a and 24b and a lever 25. The springs 24a are interposed between both side portions of the card pressing plate 23 and a part of the holder 2 and generate a relatively weak pressing force. The other spring 24b is attached between the lever 25 and a part of the holder 2 and has a pressing force stronger than that of the spring 24a. One end of the lever 25 is pivotally supported to the rear side of the holder 2. A pressing projection 26 which comes into contact with the central portion of the card pressing plate 23 is formed on the lower surface of the lever 25. At the other edge of the lever 25, an arm 25a is extended toward the side and penetrates the notch portion of the holder 2 and further extends downwardly. The lever 25 is pushed up through the arm 25a against the spring force of the spring 24b by an operating mechanism 24c consisting of a cam, solenoid, and the like.

Returning to FIGS. 2 and 3, in the card inserting port 11, there are provided a detector 31 to detect the inserted optical card 1 and a card loading/ejecting mechanism 3 for automatically carrying the optical card 1 into the card holding mechanism 21 of the holder 2 in response to a detection signal of the detector 31 and ejecting the card 1 from the holding mechanism 21.

The card loading/ejecting mechanism 3 is arranged below the height position of the holder 2. A pair of right and left loading cams 33 are attached to a rotary shaft 32 which is rotatably supported to the casing 10. The rotary shaft 32 is driven by a loading motor 37 through a speed reducing mechanism consisting of a pulley 36a and a belt 36b. The loading cams 33 are the almost semicircular cams made of a rubber material. When flat cam surfaces 33a of the cams 33 are horizontally located over the rotary shaft 32, the flat cam surfaces 33a approach the lower surface portion of the holder 2 in a contactless state. When the loading cams 33 rotate by the operation of the loading motor 37, circular cam surfaces 33b of the cams 33 come into contact with the optical card 1, thereby carrying the card 1 to a predetermined position of the card holder 2. Then, the flat cam surfaces 33a again face the card 1 and the motor 37 stops. The optical card 1 is ejected out of the apparatus by rotating the cams 33 in the direction opposite to that mentioned above.

The holder 2 has a card inclination correcting mechanism 4 to make the direction of the information recorded or recording tracks 17 of the optical card 1 coincide with the moving direction of the holder 2 due to the card transfer mechanism 5, which will be explained in detail below.

As shown in FIG. 9, the card inclination correcting mechanism 4 is constructed in a manner such that a positioning stopper 40 is attached on the rear side of the holder 2 and at the position which faces the center in the width direction of the card 1, card guides 41, 42 and 43 each consisting of a rotatable roller (this roller is not necessarily rotatable) are arranged such that two of them (e.g., the card guides 41 and 42 in the example shown in FIG. 9) are arranged on one side of the holder 2 and the other card guide (43 in this case) is arranged at the intermediate position on the other side of the holder 2. The card guides 41 and 42 are rotatably supported to both end portions of a bar member 45. A base edge portion (corresponding to the position of the guide 42) of the bar member 45 is pivotally fixed to the holder 2. The top edge portion of the bar member 45 is urged by a spring 44 whose one end is fixed to the holder 2, thereby always pushing the card guide 41 on the top edge side toward the card side i.e. insideward than the card guide 42 on the base edge side.

The card guide 43 is attached to the top edge of a leaf spring 46 whose base edge portion is fixed to the holder 2. The card guides 41, 42 and 43 are located on the flange 2 so as to mutually sandwich the optical card 1 from both sides thereof, thereby guiding the optical card 1 on both sides thereof at three points.

As shown in FIG. 11, an operating projection member 47 which downwardly extends is formed on the top edge side of the bar member 45. On the other hand, an operating member 63 which is come into engagement with and disengagement from the inside of the operating projection member 47 is formed on the optical head 6. The inclination angle correcting mechanism of the card is constructed by the operating projection member 47 and operating member 63. With reference to FIGS. 9 and 10, in the state in which the optical card 1 is held by the holder 2 and supported by the card guides 41 to 43 at three points, an angle $\theta$ of inclination of the opticl card 1, namely, the angle between the direction of the tracks 17 of the optical card 1 and the card transfer direction is detected by an optical card inclination detecting apparatus 100 (which will be described hereinbelow). Thereafter, the optical head 6 is moved outsideward in accordance with the detection angle and the bar member 45 is moved by the operating member 63 through the projection member 47, thereby correcting the inclination of the optical card 1.

A guide rod 27 is provided on the rear side of the holder 2 so as to be perpendicular to the moving direction of the holder 2, thereby movably supporting a slide member 28. The slide member 28 is coupled with the card transfer mechanism 5 as will be explained below.

The card transfer mechanism 5 is constructed in the following manner. Two axes 51 are rotatably supported to a fixed frame 50 in the casing 10. Pulleys 52 and 53 are fixed to axes 51, respectively. An endless belt 54 is reeved around the pulleys 52 and 53. A coupling pin 55 is vertically attached to a proper position of the endless belt 54. The pin 55 is rotatably coupled with the slide member 28. A pulley 56 is fixed to the lower portion of one axis 51. The rotational force of a drive motor 58 which rotates in a single direction is transmitted to the pulley 56 through transmitting means 57 such as belt or the like. A rotary encoder 59 is attached to the other axis 51. A center G of gravity of the card holder 2 and a drive center P of the transfer mechanism 5 are arranged on the same line which is parallel with the moving direction of the holder 2 when they are seen from the plan surface (also from the side elevational view) in the case where the holder 2 moves from the card inserting side to the rear position. In this embodiment, the center of the coupling pin 55 of the slide member 28 is arranged on the line in the card transfer direction which passes through the center G of gravity of the holder 2.

The optical head 6 is slidably supported to a guide rod 61 which extends in the direction perpendicular to the moving direction of the holder 2 and fixed to the casing 10. A lead screw 60 which extends in the same direction as that of the guide rod 61 engages with the optical head 6. The lead screw 60 is driven by a head transfer motor 62 which can rotate forwardly and reversely. Therefore, when the head transfer motor 62 operates, the optical head 6 is guided by the guide rod 61 and lead screw 60 and at the same time, the optical head 60 moves in the direction perpendicular to the transfer direction of the optical card 1 by the rotation of the lead screw 60. Thus, the optical head 6 accesses a predetermined information recorded or recording track of the optical card 1.

Figure 12:
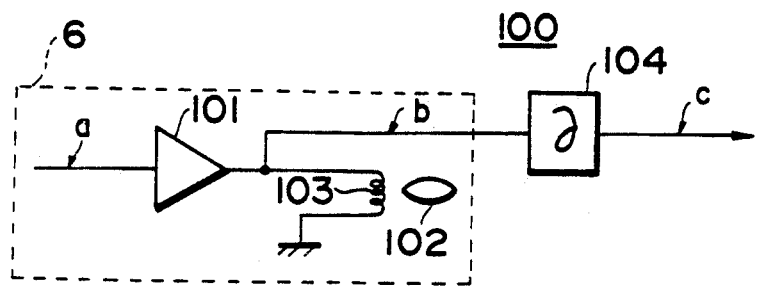
FIG. 12 is a block diagram showing an example of an optical card inclination detecting apparatus.

FIG. 12 shows an example of the optical card inclination detecting apparatus 100.

In the diagram, the portion surrounded by a broken line shows a portion included in the optical head 6 comprising a servo circuit 101, an optical system 102, and lens actuator coils 103. The optical system 102 irradiates a light beam for recording or playing-back to the optical card 1. The optical system 102 can be moved in the vertical direction (for the focusing control) and in the width direction (for the tracking control) of the optical card 1 by the actuation of the lens actuator coils 103. On the other hand, the optical system 102 has a pair of photodetectors (not shown) to receive an image of the reflected light from the optical card 1. By taking out the difference between outputs of those photodetectors, a focusing error signal and a tracking error signal a are obtained. The tracking error signal a is input to the servo circuit 101. on the basis of this input signal, the servo circuit 101 produces a tracking signal b to drive the lens actuator coils 103 (for the tracking control) .

Figure 13:
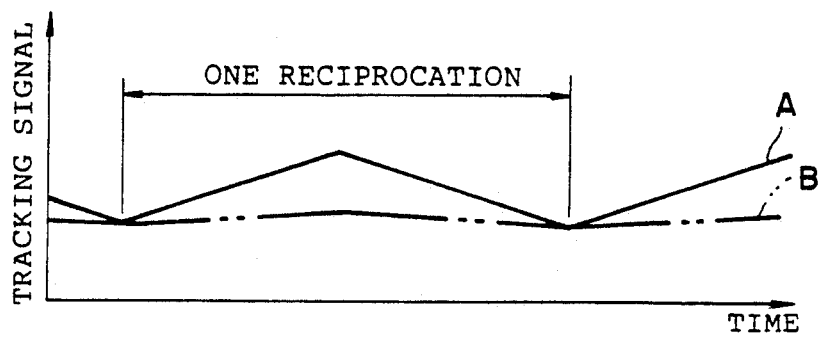
FIG. 13 is a graph showing a change in tracking signal in the inclined state of an optical card.

FIG. 13 shows a change of tracking signal in time for the period of time when the optical card 1 is reciprocated once. In the diagram, a solid line A represents a change of the tracking signal b in the case where the inclination angle $\theta$ of the optical card 1 is large. A dot-and-dash B indicates a change state of the tracking signal b when the inclination angle $\theta$ of the optical card 1 is small.

According to the optical card inclination detecting apparatus 100 in this embodiment, by monitoring the change amount of the tracking signal b (that is, the tracking signal b which is used when the tracking control is performed), the inclination angle $\theta$ of the information recorded or recording track 17 with respect to the moving direction of the optical card 1 is detected. In the case of the example of FIG. 12, the change amount of the tracking signal b is monitored by use of a differentiating circuit 104 and an angle detection signal c is output.

Figure 14:
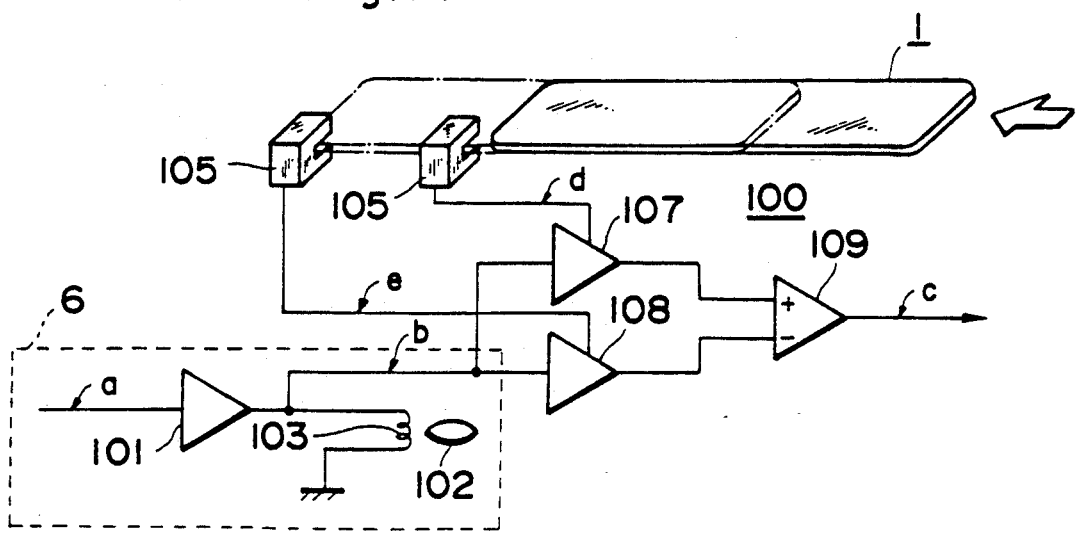
FIG. 14 is a block diagram showing another embodiment of an optical card inclination detecting apparatus.

FIG. 14 shows another embodiment of the optical card inclination detecting apparatus 100. This apparatus comprises: a pair of card detecting sensors 105 and 106; a pair of sample and hold circuits (S/H circuits) 107 and 108; and a substracter 109. The sensors 105 and 106 are arranged along the transfer path of the optical card 1 and detect the moving optical card 1 at two different positions. The tracking signal b is input to the S/H circuits 107 and 108 and sampled and held at the input timings of card detection signals d and e from the sensors 105 and 106. The tracking signals b sampled and held by the S/H circuits 107 and 108 are given to the substracter 109. The substracter 109 calculates the difference between those input signals and produces the angle detection signal c.

The operation of the optical card processing apparatus will now be described.

In the card insertion standby mode, the holder 2 is located near the card inserting port 11. The loading cams 33 of the card loading/ejecting mechanism 3 are set so that the flat cam surfaces 33a face the holder 2. In the card holding mechanism 21 of the holder 2, the lever 25 is pushed up by the operating mechanism 24c, so that a weak pressing force of the springs 24a is applied to the card pressing plate 23.

In this state, when the optical card 1 is inserted into the card inserting port 11 and this insertion is detected by the detector 31, the loading motor 37 starts operate and the cams 33 rotate. The circular cam surfaces 33b come into contact with the lower surface of the inserted optical card 1. Thus, the inserted optical card 1 is automatically interposed between the flange 22 and the card pressing plate 23 of the card holding mechanism 21. Since the front edge portion 23a of the pressing plate 23 is inclined upwardly, the optical card 1 can be smoothly inserted (refer to FIG. 8)

The optical card 1 carried in the holder 2 is temporarily positioned by the card guides 41 to 43 and positioning stopper 40. However, since there is a tendency such that the inner side of the optical card 1 is pressed by the card guide 41 due to the operation of the spring 44, the inclination angle θ in a predetermined direction is forcedly given to the optical card 1 (FIG. 9).

Next, since the operating mechanism 24c in the card holding mechanism 21 releases the lever 25, a strong pressing force of the spring 24b acts on the card pressing plate 23 through the lever 25. The optical card 1 is fixed by the pressing forces of both springs 24a and 24b (refer to FIG. 6).

In the above fixing operation, since the optical card 1 is held by the weak pressing force of the spring 24a, the position of the card 1 does not deviate.

In this state, the card transfer mechanism 5 is made operative to reciprocate the optical card 1 together with the holder 2. When the tracking control is performed such that the light spot irradiated from the optical system 102 moves along the track guides 18 (the transfer operation will be described in detail hereinlater), the tracking signal b is output from the optical head 6. The tracking signal b indicates the moving distance of the optical system 102. The change amout of the tracking signal b is monitored by the optical card inclination detecting apparatus 100, so that the inclination angle θ (signal c) of the track 17 (track guide 18) for the forward moving direction (which means the direction from the card inserting port 11 to inner side of the casing 10) of the optical card 1 is detected.

After completion of the detection of the inclination angle θ, the operating mechanism 24c in the card holding mechanism 21 pushes up the lever 25, thereby releasing the strong pressing force by the spring 24b from the card pressing plate 23. Therefore, in this state, only the weak pressing force of the springs 24a acts on the card pressing plate 23.

Next, the optical head 6 moves toward the side of the operating projection member 47 in accordance with the detected inclination angle. The operating member 63 pushes the operating projection member 47 outwardly from the inside. Thus, the optical card 1 is moved in the direction indicated by an arrow S shown in FIG. 9 by the force larger than the pressing force of the springs 24a, thereby correcting the position of the optical card 1. In this manner, the transfer direction of the optical card 1 is made coincide with the direction of the track 17 (refer to FIG. 10).

The relation between the value of the signal c and the inclination angle θ of the optical card 1 is predetermined. Therefore, by moving the operating projection member 47 (namely, the optical head 6) on the basis of the signal c, the inclination angle θ can be corrected to zero. On the other hand, since the optical head 6 is driven by the head transfer motor 62 consisting of a stepping motor through the lead screw 60, the number of drive pulses to be applied to the motor 62 to correct the inclination angle θ to zero is calculated by use of the pitch of the screw 60 and the rotational angle of the stepping motor 62 per drive pulse. When the value of the signal c is zero, in other words, when the inclination angle θ is zero, there is no need to correct the inclination of the optical card 1 by the optical head 6.

Subsequent to the optical card inclination correcting operation, the operating mechanism 24c in the card holding mechanism 21 again releases the lever 25, thereby allowing the strong pressing force of the spring 24b to act on the card pressing plate 23 through the lever 25. The optical card I is fixed by the pressing forces of the springs 24a and 24b. When such a fixing operation is executed, since the optical card 1 is held by the weak pressing force of the springs 24a, the position of the card 1 does not deviate.

If necessary, the holder 2 is again reciprocated and a check is made by the value of the signal c to see if the inclination angle θ of the optical card 1 has been corrected to zero or not. In accordance with the degree of correction, the foregoing correcting operation is performed and, if necessary, the card 1 is ejected out and is again inserted into the apparatus.

After the optical head 6 was returned to the original position, the card transfer mechanism 5 operates. The endless belt 54 is driven by the rotation of the drive motor 58. The coupling pin 55 attached to the belt 54 allows the holder 2 to be pulled and to be moved in the forward direction along the guide rods 13 through the slide member 28. When the coupling pin 55 reaches the outer periphery of the pulley 52, the pin 55 causes the slide member 28 to slide in the width direction of the holder 2 and is circulated by the half circle of the pulley 52 and moves to the returning side. Next, in a manner similar to the forward going operation, the coupling pin 55 returns the holder 2 in the reverse direction along the guide rods 13 through the slide member 28. Thus, the holder 2 can be reciprocated by the continuous rotation of the drive motor 58 in the single direction. When the optical card 1 forwardly moves (at this time, the recording/playing-back to/from the optical card 1 is executed), the center G of gravity of the holder 2 and the drive center P of the feeding mechanism 5 are aligned on the same line. Therefore, the yawing and pitching upon movement of the card are eliminated and a high transfer accuracy is derivd. This guarantees the accurate recording and playing-back operations.

When the holder 2 forwardly moves, the tracks 17 of the optical card 1 relatively move in the track direction for the corresponding optical head 6 and information is recorded and reproduced. When the holder 2 is returned to the first position near the card inserting port 11, the head transfer motor 62 operates and the next track is accessed through the guide rod 61 and lead screw 60. The similar card transfer operation and the recording/reproducing operations associated therewith are again repetitively executed.

In the recording/reproducing operations, the loading cams 33 are held in the state in which the flat cam surfaces 33a are horizontally located and do not come into contact with the optical card 1 and card holder 2. Thus, the loading cams 33 do not become an obstacle in the movement of the holder 2 and the information can be processed at a high reliability.

As mentioned above, the card holding portion has been arranged below the card holder supported by the guiding mechanism and the card transfer mechanism and optical head have been arranged substantially on almost the same plane below the holder. Therefore, the apparatus can be made thin and miniaturized as compared with the conventional apparatus in which the optical head is arranged over the card holder and the card transfer mechanism is arranged below the card holder. On the other hand, the card transfer mechanism has been constructed such that the endless belt is wound between a pair of pulleys, the coupling pin is attached to a proper position of the belt, the pulleys are driven by the drive motor which continuously rotates in a single direction, the slider which moves in the direction perpendicular to the moving direction of the card holder is provided for the card holder, and the coupling pin is pivotally coupled with the slider. Therefore, the card holder is reciprocated by the continuous rotation in the single direction of the drive motor. Thus, the drive motor can be miniaturized and can operate at a high speed.

Further, since the card loading/ejecting mechanism has been provided, the inserting or ejecting operation of the optical card into or from the holding portion can be accurately executed. Moreover, since the card holder has the card inclination angle correcting mechanism, by correcting the angle of inclination of the optical card in accordance with the angle difference between the track direction of the optical card and the card transfer direction, the movable range of the optical head necessary for the tracking servo control can be narrowed. The optical head can be miniaturized and its weight can be reduced.

On the other hand, since the center of gravity of the card holder and the drive center of the transfer mechanism have been located on the same line, the yawing and pitching at the movement of the holder are eliminated and the card feeding accuracy can be improved.

Further, since the optical head has been supported in the lower portion of the apparatus, it is hardly influenced by the vibration when the card holder reciprocates and, accordingly, the information can be accurately recorded and reproduced. Also, since the information recording or recorded portion of the optical card faces downwardly, there are excellent practical effects such that no dust is deposited on this portion and the like.

In addition, the card loading/ejecting mechanism comprises: the detector, arranged on the path of the optical card so as to face it, for detecting the optical card; and loading cams which come into contact with the optical card and convey it only when the optical card is attached to or detached from the card holder and which do not come into contact with the optical card and card holder upon recording/reproduction. Therefore, when the optical card is attached to or ejected from the card holder, the optical card is forcedly carried by the rotation of the loading cams and is always set to the accurate position in the card holder. Consequently, the erroneous recording or reproduction of information due to the deviation of the attaching position of the optical card does not occur. The reliability in recording and reproduction is improved. On the other hand, since the optical card is automatically loaded and ejected, the operability is also improved.

Further, the card holding mechanism has been constituted by: the card pressing plate whose both sides correspond to the flanges of the card holder, by which both side portions of the card are supported; and the pressurizing means which can act the pressing force whose intensity can be switched on the card pressing plate. Therefore, particularly, when the card is loaded or ejected, the card holding force can be set to a weak force, so that the loading/ejecting actuator of small size, low torque and low cost can be used. Moreover, since the card is held by the weak holding force upon loading/ejecting of the card, when the holding force is switched to the strong force, the position of the card does not deviate.

On the other hand, when data is recorded to or played-back iran the card, the card holding force can be set to the strong force, so that the card transfer speed can be raised.

Further, the angle of inclination of the information recording or recorded track with respect to the moving direction of the optical card is detected and the inclination of the optical card can be corrected in accordance with the detected angle. Therefore, even when the movable range of the optical head for the tracking servo control is narrow, or even if its tracking performance is not so good, no problem occurs. In addition, there is no need to make the shape of the optical card at a high accuracy. Consequently, the small optical head whose movable range is narrow can be used. The optical head can be miniaturized and its weight can be reduced. The tracking performance can be improved. The costs of the apparatus can be also reduced.

Figure 15:
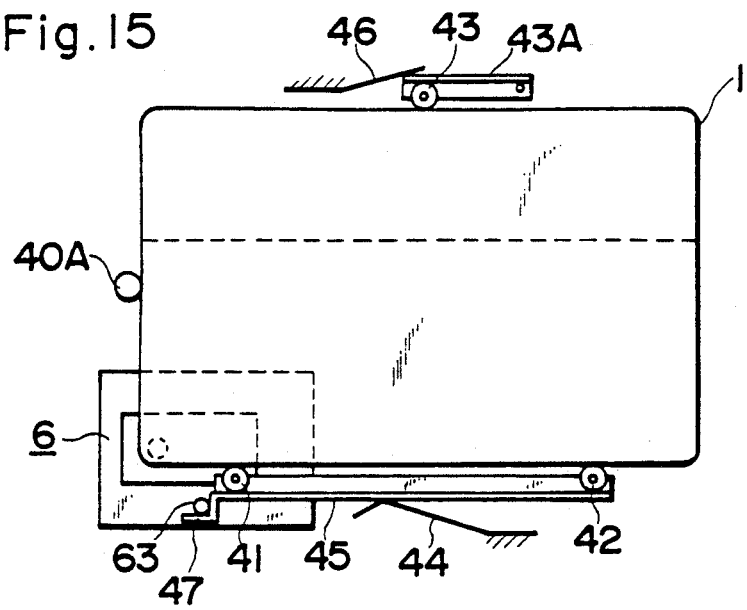
FIGS. 15 and 16 are plan vies showing a modification of a card holding apparatus, respectively.
Figure 16:
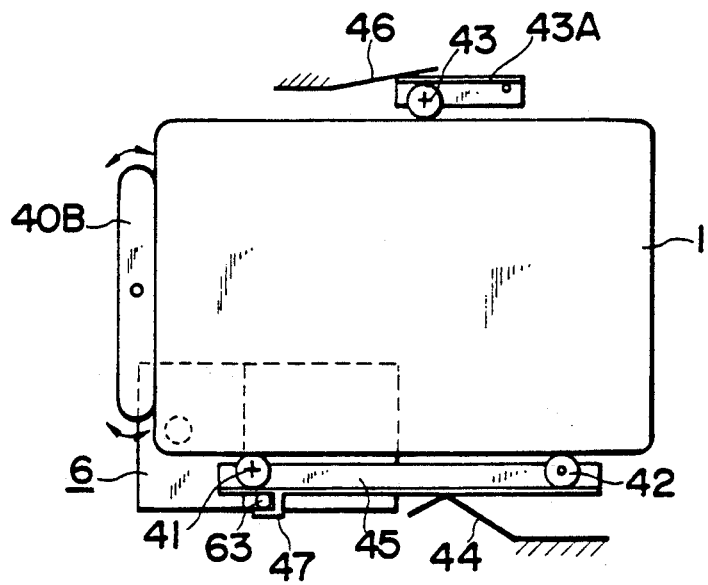
Figure 17:
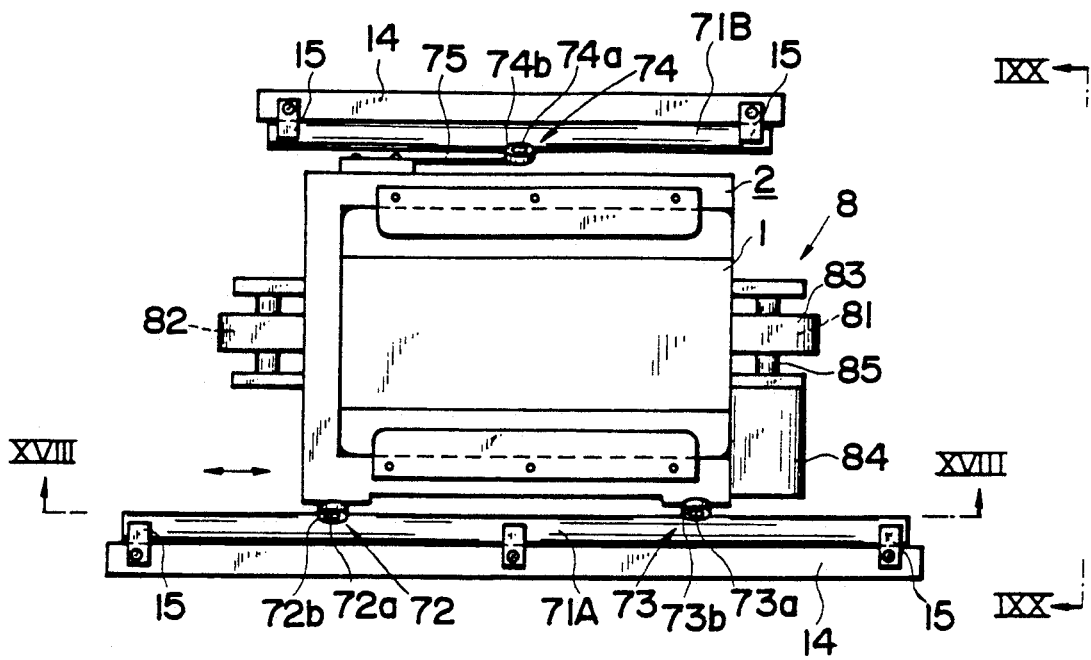
FIGS. 17 to 20 show another embodiment of the invention.
Figure 18:
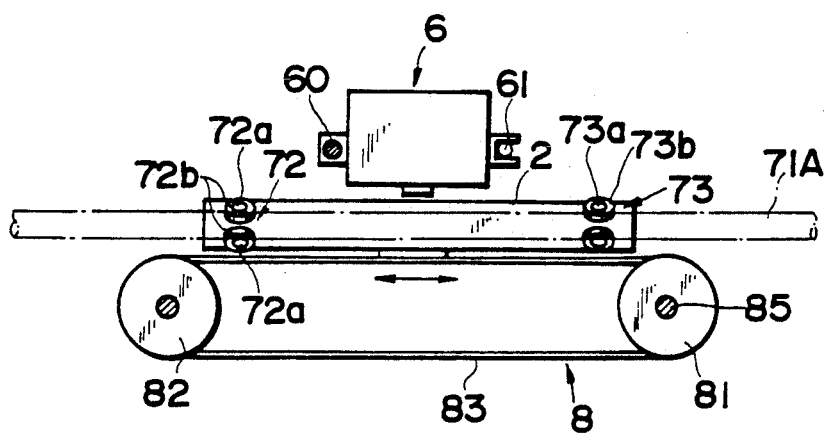
Figure 19:
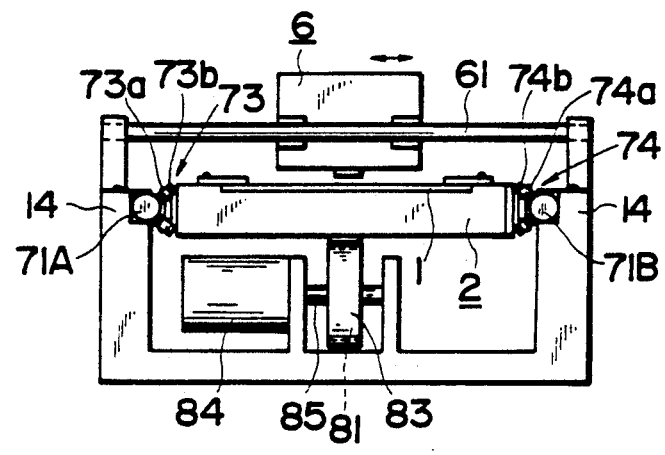

FIGS. 15 and 16 illustrate other examples of the card holding portions in the card inclination correcting mechanism 4.

In FIG. 15, one end of a bar member 43A is pivotally attached to the holder 2. The card guide roller 43 is rotatably attached to the other end of the bar member 43A and urged to the card 1 by the leaf spring 46. The positioning stopper 40A having a circular cross section is used. The operating projection member 47 is formed at the top end portion of the bar member 45.

Although the stoppers 40 and 40A shown in FIGS. 9 and 15 come into contact with the card 1 in a point contact manner, in the case of FIG. 16, a stopper 40B comes into contact with the card 1 in an area contact manner. The stopper 40B is a bar-shaped stopper and is pivotally attached to the holder 2 at the center thereof.

As mentioned above, the card holder has the supporting mechanism for supporting and guiding or holding the optical card by at least three portions of the opposite sides in a point contact manner. Therefore, the contact friction of the card supporting portion is small. The loading motor of a low torque can be used. Moreover, since the card is supported in a point contact manner, by adjusting the deviation of the supporting points in accordance with the modification of the card, even the modified card can be stably held. The structure of the card holder is simplified and its weight is reduced. The card feeding motor of small size and low torque can be also used. The costs of the apparatus can be reduced.

In the foregoing embodiments, the card holder 2 has been movably supported by the two guide rods 13. In such a structure, the high parts accuracy of the guide rods 13, bearing 20 and the like, high assembling accuracy, accurate parallel degree, high gap accuracy of the bearing and the like are required.

An explanation will now be made with regard to an embodiment in which the card transfer accuracy can be improved although the above accuracy is not so high.

Referring now to FIGS. 17 to 20, the card transfer mechanism slidably supports both sides of the card holder 2 with use of parallel guide rods 71A and 71B. The guide rods 71A and 71B are made of straight rods having a circular shape in section and the whole length of each rod is contacted with a frame 14 of the casing 10 and proper portions of the rod are fixed to the frame 14 with fixing devices 15. Receiving portions 72, 73 and 74 formed on the card holder 2 are received by the guide rods 71A and 71B by using the opposite inside surfaces thereof as guide surfaces.

The card holder 2 is constructed such that the receiving portions 72 and 73 are arranged on both end portions of one side, the receiving portion 74 is arranged at the intermediate portion of the other side through pressurizing means, and each of the receiving portions 72, 73 and 74 abuts on the guide surfaces of the corresponding guide rods 71A and 71B and is elastically pressed by the pressurizing means.

Various kinds of structures can be applied to the receiving portions 72 to 74. In this embodiment, the receiving portion 72 is constituted in a manner such that two axes 72a which are projected in the vertical oblique direction and are arranged perpendicularly to each other are attached to the card holder 2, thereby axially supporting a pair of rotary wheels 72b, and the rotary wheels 72b are come into contact with the upper and lower symmetrical positions of the guide surface of the guide rod 71A.

The other receiving portions 73 and 74 are also constituted by: axes 73a and 74a; and rotary wheels 73b and 74b which are rotatably attached to these fulcrum axes, respectively.

The pressurizing means is constituted by attaching and fixing the base edge portion of a leaf spring 75 to the card holder 2. The axis 74a of the receiving portion 74 is attached to the top edge portion of the leaf spring 75.

Figure 21:
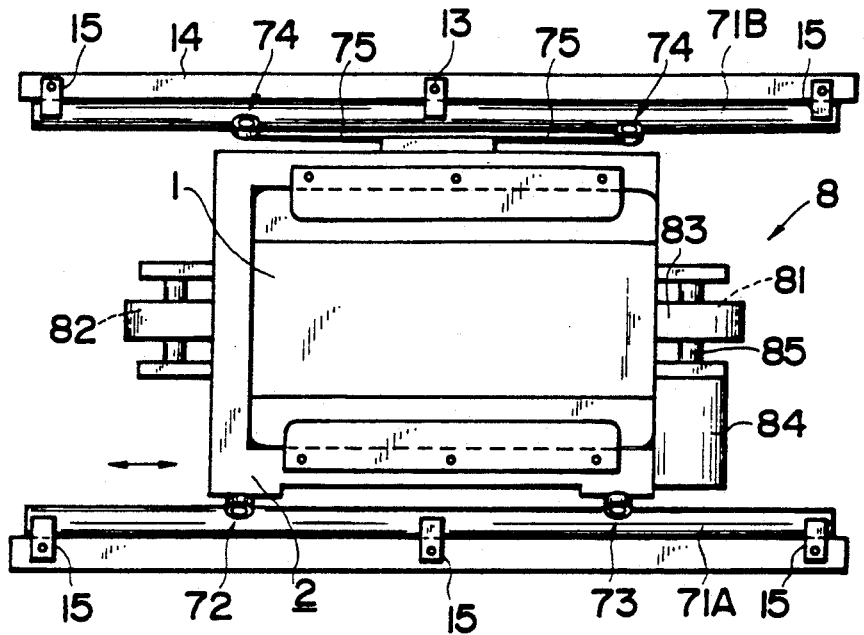
FIGS. 21 and 22 are plan views showing modifications of the card transfer mechanism, respectively.

FIG. 21 shows a modification. The leaf springs 75 which are extended in the front and back directions are attached to the central portions of the front and back half portions of the card holder 2. The receiving portions 74 similar to those in the foregoing example are formed in the top edge portions of both leaf springs 75.

Figure 22:
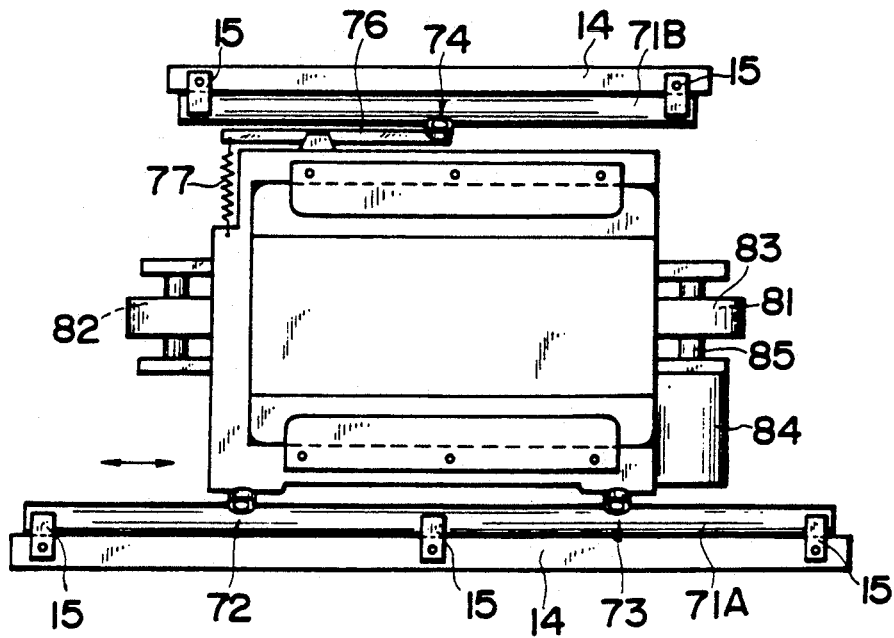
Figure 23:
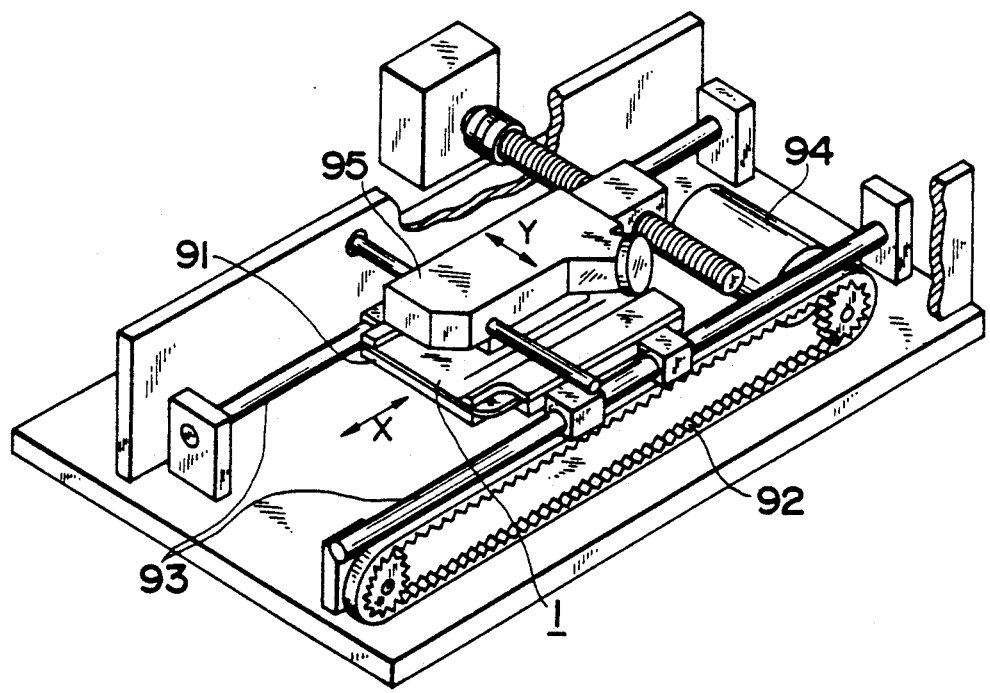
FIG. 23 is a perspective view showing a conventional optical card processing apparatus.

FIG. 22 shows still another modification. An oscillating arm 76 is pivotably attached to the side of the card holder 2 at the center portion thereof. The receiving portion 74 similar to that in the foregoing example is formed in the one end portion of the arm 76. A tension spring 77 is attached between the other end portion of the arm 76 and the holder 2, thereby pressing the receiving portion 74 to the guide rod 71B.

The foregoing supporting and guiding mechanism of the card holder 2 can be obviously used in place of the guiding mechanism 12 consisting of the guide rods 13 and bearing 20 in the embodiments shown in FIGS. 2 to 16.

In the foregoing embodiments, a driving mechanism 8 which reciprocates the card holder 2 is arranged below the holder 2 and the optical head 6 is arranged over the holder 2.

The driving mechanism 8 is constructed in a manner such that an endless belt 83 is reeved around pulleys 81 and 82 which are arranged at opposite end positions of the reciprocating range of the card holder 2, the upper side of the belt 83 is attached to the lower surface of the card holder 2, and one pulley 81 is fixed to a rotary shaft 85 of a drive motor 84 which rotates forwardly and reversely.

The guide rod 61 and lead screw 60 which cross perpendicularly to the guide rods 71A and 718 are arranged over the card holder 2, thereby enabling the optical head 6 to be supported to the guide rod 61 and lead screw 60 so as to be reciprocated.

When the drive motor 84 operates, the card holder 2 is reciprocated since the receiving portions 72, 73 and 74 on both sides are slided along the guide rods 71A and 71B, respectively.

Figure 20:
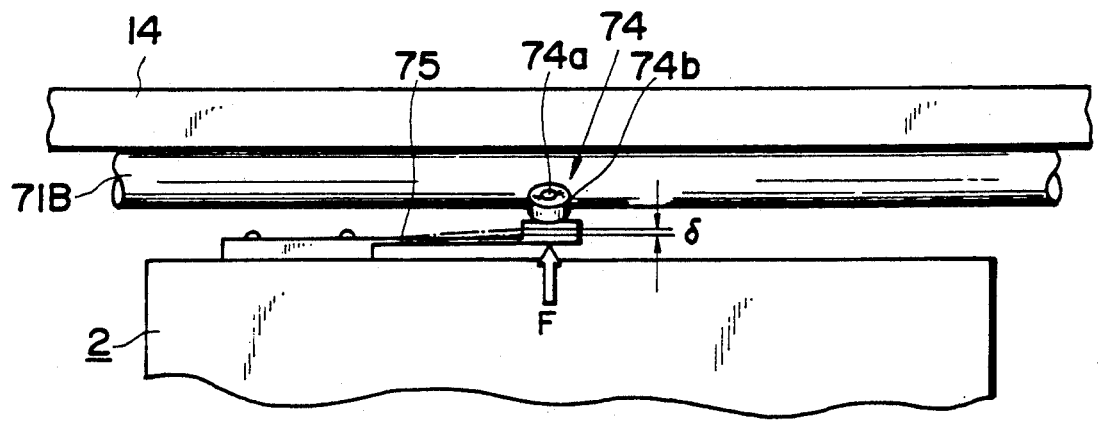

At this time, since the whole lengths of the guide rods 71A and 71B are joined and supported to the frame 14, no deflection occurs. Therefore, as shown in FIG. 20, a constant deformation amount δ is always caused in the pressurizing means 75 in accordance with a pressure F, thereby enabling the card holder 2 to be moved stably without vibration. On the other hand, the receiving portions 72 to 74 on both sides of the card holder are pressed to the corresponding guide rods 71A and 71B with a proper pressure by the elastic pressure of the pressurizing means 75, so that the stable transfer of the card holder 2 accuracy can be obtained.

The reciprocating driving mechanism 5 of the holder shown in FIGS. 2 to 16 can be also obviously applied to this embodiment. Further, the reciprocating driving mechanism of the holder and the optical head can be also apparently arranged below the holder.

As mentioned above, the whole lengths of the outside surfaces of the parallel guide rods are supported to the frame. The inside surfaces of the rods serve as the guide surfaces which face each other. The guide members (receiving portions) are arranged on both sides of the card holder and are slidably come into engagement with the guide surfaces. Therefore, although the guide rods are applied with the pressures of the guide members, no deflection occurs because they are supported to the frame. The vibration of the card holder is reduced. Therefore, the tracking performances in the auto-focusing control and auto-tracking control are improved and the card can be transferred at a high speed. The guide rods can be made thin. Thus, the apparatus can be miniaturized and its weight can be reduced. The costs of the apparatus can be decreased.

Further, the receiving portions are arranged on both sides of the card holder and slidably supported to the parallel guide rods. The elastic pressurizing means is arranged between at least one of the guide rods and the receiving portion. Therefore, the guide rods support the receiving portions at a constant pressure by the elasticity of the pressurizing means. Thus, the guide rods and receiving portions do not require the high parts accuracy and high assembling accuracy as in the conventional structure. The card feeding accuracy is improved.

Moreover, the guide rods and receiving portions can be miniaturized and their weights can be reduced. The costs of the parts and the assembling costs can be decreased. Thus, the overall costs can be remarkably reduced.

What is claimed is:

1. An optical card processing apparatus comprising:
   a card holder which is supported to a guiding mechanism so as to be reciprocated and is formed with an optical card holding portion on a lower surface;
   a card loading/ejecting mechanism, arranged at a card inserting port, for detecting an optical card and for attaching and detaching said optical card to and from said optical card holding portion of said card holder;
   a card inclination correcting mechanism, arranged for said holder, for making a track line direction of the optical card coincide with a moving direction of the card holder;
   a card transfer mechanism in which a pair of pulleys are arranged along a moving path of the card holder, an endless belt is wound between said pair of pulleys, a proper portion of said belt is coupled with the card holder, and one of said pulleys is coupled with a drive motor which can rotate in a single direction, respectively;
   an optical head, arranged on the same side as said card transfer mechanism with respect to said card holder so as to face the optical card, for writing and reading information onto and from the optical card; and
   a transfer mechanism to move the optical head in the direction perpendicular to the moving direction of the optical card.

2. A card transfer mechanism comprising:
   parallel guide rods;
   bearings, provided on both side of a card holder, for slidably supporting the card holder on said guide rods; and
   elastic pressurizing means arranged between at least one of the slide bearings and the card holder, for pressing said at least one slide bearing against at least one guide rod.

3. A card transfer mechanism according to claim 2, wherein said elastic pressurizing means comprises a leaf spring having one end fixed to the side of the card holder and the other end attached to said at least one slide bearing.

4. A card transfer mechanism according to claim 2, wherein said elastic pressurizing means comprises:
   an oscillating arm which is attached to the side of the card holder at the center thereof so as to be freely oscillated and said at least one slide bearing is attached to one end of said arm; and
   a spring coupled, with the other end of the arm, for pressing said at least one slide bearing against said at least one guide rod.

5. A card transfer mechanism comprising a frame; a card holder having two sides thereof slidably supported to parallel guide rods, wherein whole lengths of outside surfaces of the guide rods which face each other serve as guide surfaces and, guide members, provided on both sides of the card holder, for guiding the holder in contact relation with the inside surfaces of said pair of guide rods, and
   wherein each of said guide members comprises a rotary wheel which is axially fixed to the card holder.

6. An optical card processing apparatus comprising:
   (A) a card holder which is supported to a guiding mechanism so as to be reciprocated and which has an optical card holding portion; and
   (B) a card loading/ejecting mechanism for automatically carrying or ejecting an optical card inserted from a card inserting port into or from said optical card holding portion,
   wherein said card loading/ejecting mechanism comprises;
      (i) a detector, arranged to face a passageway for the optical card, for detecting the optical card, and
      (ii) a loading roller which has a shape such that it comes into contact with the optical card only when an optical card is loaded to or removed from the card holder and which conveys the optical card to a predetermined position at which the roller does not come into contact with the optical card and the card holder.

7. An optical card processing apparatus in which an optical card is moved for an optical head and information is written onto or read from an information recording track of the optical card by the optical head, said processing apparatus comprising:
   a movable holder to hold the optical card;
   a card transfer mechanism to move the optical card together with said holder;
   card holding means for applying a pressure on the optical card when the holder moves and thereby for fixing the optical card to the holder;
   a guiding mechanism for guiding the sides of an optical card which is carried into said card holder and for giving a proper angle of inclination to the optical card with respect to a moving direction of the card holder;
   a pressurizing mechanism for pressing the optical card carried into the card holder to fix it;
   optical card inclination detecting means for detecting an angle of inclination of the information recording track with respect to the moving direction of the optical card; and
   a card inclination correcting mechanism for moving the optical card, in a state in which the pressure by the card holding means is set to a weak force, on the basis of a detection value of said optical card inclination detecting means and thereby for making the moving direction of the optical card coincide with the direction of the information recording track.

* * * * *